(12) United States Patent
Elyakim et al.

(10) Patent No.: US 10,997,975 B2
(45) Date of Patent: May 4, 2021

(54) ENHANCED VEHICLE KEY

(71) Applicant: DSP Group Ltd., Herzliya (IL)

(72) Inventors: Ofer Elyakim, Tel Aviv (IL); Tali Chen, Neve Yam (IL); Lior Blanka, Rosh Haayin (IL)

(73) Assignee: DSP GROUP LTD., Herzliya (IL)

(*) Notice: Subject to any disclaimer, the term of this patent is extended or adjusted under 35 U.S.C. 154(b) by 128 days.

(21) Appl. No.: 16/278,734

(22) Filed: Feb. 19, 2019

(65) Prior Publication Data

US 2019/0259383 A1 Aug. 22, 2019

Related U.S. Application Data

(60) Provisional application No. 62/632,440, filed on Feb. 20, 2018.

(51) Int. Cl.
*G10L 15/22* (2006.01)
*G10L 15/10* (2006.01)
*G07C 9/29* (2020.01)
*B60R 25/30* (2013.01)
*B60R 25/40* (2013.01)
*G10L 15/08* (2006.01)

(52) U.S. Cl.
CPC ............... *G10L 15/22* (2013.01); *G07C 9/29* (2020.01); *G10L 15/10* (2013.01); *B60R 25/302* (2013.01); *B60R 25/40* (2013.01); *G10L 2015/088* (2013.01); *G10L 2015/223* (2013.01)

(58) Field of Classification Search
CPC ..... G10L 15/22; G10L 15/10; G10L 2015/088; G10L 2015/223; G07C 9/29; B60R 25/302
See application file for complete search history.

(56) References Cited

U.S. PATENT DOCUMENTS

| | | | | |
|---|---|---|---|---|
| 6,182,807 B1* | 2/2001 | Saito | ................. | B60G 17/0185 191/2 |
| 6,550,351 B1* | 4/2003 | O'Reilly | ................ | F16H 59/105 74/335 |
| 8,044,782 B2* | 10/2011 | Saban | .................... | B60N 2/002 340/438 |
| 9,084,197 B2* | 7/2015 | Murray | ............. | H04W 52/0274 |
| 9,466,314 B2* | 10/2016 | Wischhof | ............ | B60R 16/0373 |
| 9,536,360 B2* | 1/2017 | Chang | ................ | G07C 9/00563 |
| 9,626,966 B2* | 4/2017 | Berndt | .................... | G10L 15/22 |
| 9,845,050 B1* | 12/2017 | Garza | ....................... | B60Q 9/00 |
| 10,486,649 B1* | 11/2019 | Bennie | .................... | B60R 25/40 |
| 10,710,596 B1* | 7/2020 | Kern | ....................... | G10L 15/08 |
| 2003/0098211 A1* | 5/2003 | Saito | ................... | B60R 16/0315 191/3 |

(Continued)

*Primary Examiner* — Mohammad K Islam
(74) *Attorney, Agent, or Firm* — Reches Patent

(57) ABSTRACT

A enhanced vehicle key and a method for voice activation, the method may include supplying power to a low power trigger sensor of a enhanced vehicle key, by a power source of the enhanced vehicle key; wherein the supplying of power is preceded by powering the enhanced vehicle key while a part of the enhanced vehicle key is positioned within an ignition switch of a vehicle; detecting, by the low power trigger sensor, a voice trigger; awakening, following the detection, a processor of the enhanced vehicle key; searching, by the processor, for a voice command; and when finding the voice command then executing the voice command.

22 Claims, 9 Drawing Sheets

(56) References Cited

U.S. PATENT DOCUMENTS

| | | | | |
|---|---|---|---|---|
| 2008/0002758 | A1* | 1/2008 | Schmidt | H04W 28/18 |
| | | | | 375/130 |
| 2012/0274456 | A1* | 11/2012 | Patenaude | B60R 25/403 |
| | | | | 340/425.5 |
| 2013/0237174 | A1* | 9/2013 | Gusikhin | H04W 4/90 |
| | | | | 455/404.1 |
| 2015/0116079 | A1* | 4/2015 | Mishra | H04W 12/06 |
| | | | | 340/5.52 |
| 2015/0170653 | A1* | 6/2015 | Berndt | G10L 15/22 |
| | | | | 704/275 |
| 2016/0009178 | A1* | 1/2016 | Busse | B60K 37/04 |
| | | | | 361/679.21 |
| 2017/0030133 | A1* | 2/2017 | Elie | B60R 16/03 |
| 2017/0276113 | A1* | 9/2017 | Hashim | F02N 11/087 |
| 2017/0349145 | A1* | 12/2017 | Tanabe | E05F 15/73 |
| 2018/0053360 | A1* | 2/2018 | Jergess | G07C 9/00309 |
| 2018/0108369 | A1* | 4/2018 | Gross | B60R 25/1009 |
| 2018/0354461 | A1* | 12/2018 | Yae | B60R 16/0373 |
| 2018/0367731 | A1* | 12/2018 | Gatti | G06K 9/00832 |
| 2019/0049942 | A1* | 2/2019 | Dusane | B60R 25/04 |
| 2019/0092280 | A1* | 3/2019 | Oesterling | H04L 63/0428 |
| 2019/0170722 | A1* | 6/2019 | Stefanon | F02M 37/0082 |
| 2019/0180619 | A1* | 6/2019 | Suzuki | G08G 1/146 |
| 2019/0237069 | A1* | 8/2019 | Zhao | G06F 40/55 |
| 2019/0279613 | A1* | 9/2019 | Wheeler | G10L 15/005 |
| 2019/0333508 | A1* | 10/2019 | Rao | G10L 15/25 |
| 2020/0047687 | A1* | 2/2020 | Camhi | G10L 15/22 |

\* cited by examiner

ENHANCED VEHICLE KEY

CROSS REFERENCE

This application claims priority from U.S. provisional patent 62/632,440 filing date Feb. 20, 2018.

BACKGROUND

There is a growing need to perform voice activated operations.

SUMMARY

There may be provided a method for voice activation, the method may include supplying power to a low power trigger sensor of an enhanced vehicle key, by a power source of the enhanced vehicle key. The supplying of power may be preceded by powering the enhanced vehicle key while a part (for example a blade) of the enhanced vehicle key may be positioned within an ignition switch of a vehicle. The method may also include (i) detecting, by the low power trigger sensor, a voice trigger; (ii) awakening, following the detection, a processor of the enhanced vehicle key; (iii) searching, by the processor, for a voice command; and (iv) when finding the voice command then executing the voice command. Using a low power voice trigger that may be always on and awaiting the processor only when a voice trigger is detected reduces the size and power consumption of the enhanced vehicle key.

The executing of the voice command may include requesting, by the enhanced vehicle key, the vehicle to generate a vehicle location indication that may be indicative of a location of the vehicle.

The executing of the voice command may include generating, by the enhanced vehicle key, a key location indication that may be indicative of a location of the enhanced vehicle key.

The executing of the voice command may include determining, by the enhanced vehicle key, whether a baby is present in the vehicle.

The executing of the voice command may include determining, by the enhanced vehicle key, an occurrence of an accident and reporting the occurrence of the accident.

The executing of the voice command may include determining, by the enhanced vehicle key, an occurrence of an event.

The event may be selected out of a broken glass, a vehicle engine activation, a vehicle engine deactivation.

The determining may be preceded by receiving sensed information from a sensor located outside the enhanced vehicle key, wherein the determining may be based on the sensed information.

The method may include reporting the occurrence of the event.

The execution of the voice command may include (i) receiving a message (voice message) and recording the message. The execution may be followed by (a) detecting, by the low power trigger sensor, another voice trigger, (b) awakening, following the detection of the other voice trigger, the processor, (c) searching, by the processor, for another voice command; and (d) when finding the other voice command then executing the other voice command. When the other voice command is for playing the recorded message then the executing may include playing the recorded message.

The method may include applying, by the processor, one or more pre-processing voice algorithms, on audio signals detected by a microphone of the enhanced vehicle key.

There may be provided an enhanced vehicle key that may include a housing, a power source, a processor, a low power trigger sensor that may be configured to detect a voice trigger and to participate (trigger, request, instruct, alert) in an awakening. Following the detection, the processor may be configured to search for a voice command and to participate in an execution of a voice command when finding the voice command.

The participation in the execution may include executing the voice command, executing part of the voice command, controlling the execution of the execution of the voice command, controlling the execution of a part of the execution of the voice command, instructing and/or requesting and/or performing one or more step as a part of the execution of the voice commands, and the like.

The enhanced vehicle key may be configured to execute the voice command by requesting, by the enhanced vehicle key, the vehicle to generate a vehicle location indication may be indicative of a location of the vehicle.

The enhanced vehicle key may be configured to execute the voice command by generating a key location indication may be indicative of a location of the enhanced vehicle key.

The enhanced vehicle key may be configured to execute the voice command by determining whether a baby may be present in the vehicle.

The enhanced vehicle key may be configured to execute the voice command by determining an occurrence of an accident and reporting the occurrence of the accident.

The enhanced vehicle key may be configured to execute the voice command by determining an occurrence of an event.

The event may be selected out of a broken glass, a vehicle engine activation, a vehicle engine deactivation.

The enhanced vehicle key may be configured to receive sensed information from a sensor located outside the enhanced vehicle key, wherein the determining may be based on the sensed information.

The enhanced vehicle key may be configured to report the occurrence of the event.

The enhanced vehicle key may be configured to (i) receive a message, (ii) recording the message, (iii) detect, by the low power trigger sensor, another voice trigger, (iv) awaken, following the detection of the other voice trigger, the processor, (v) search, by the processor, for another voice command. When finding the other voice command then execute the other voice command. The other voice command may be for playing the recorded message, and the enhanced vehicle key may play the recorded message.

The processor may be configured to apply one or more pre-processing voice algorithms, on audio signals detected by a microphone of the enhanced vehicle key.

BRIEF DESCRIPTION OF THE INVENTION

The present invention will be understood and appreciated more fully from the following detailed description taken in conjunction with the drawings in which.

DETAILED DESCRIPTION OF THE INVENTION

Figure 1:
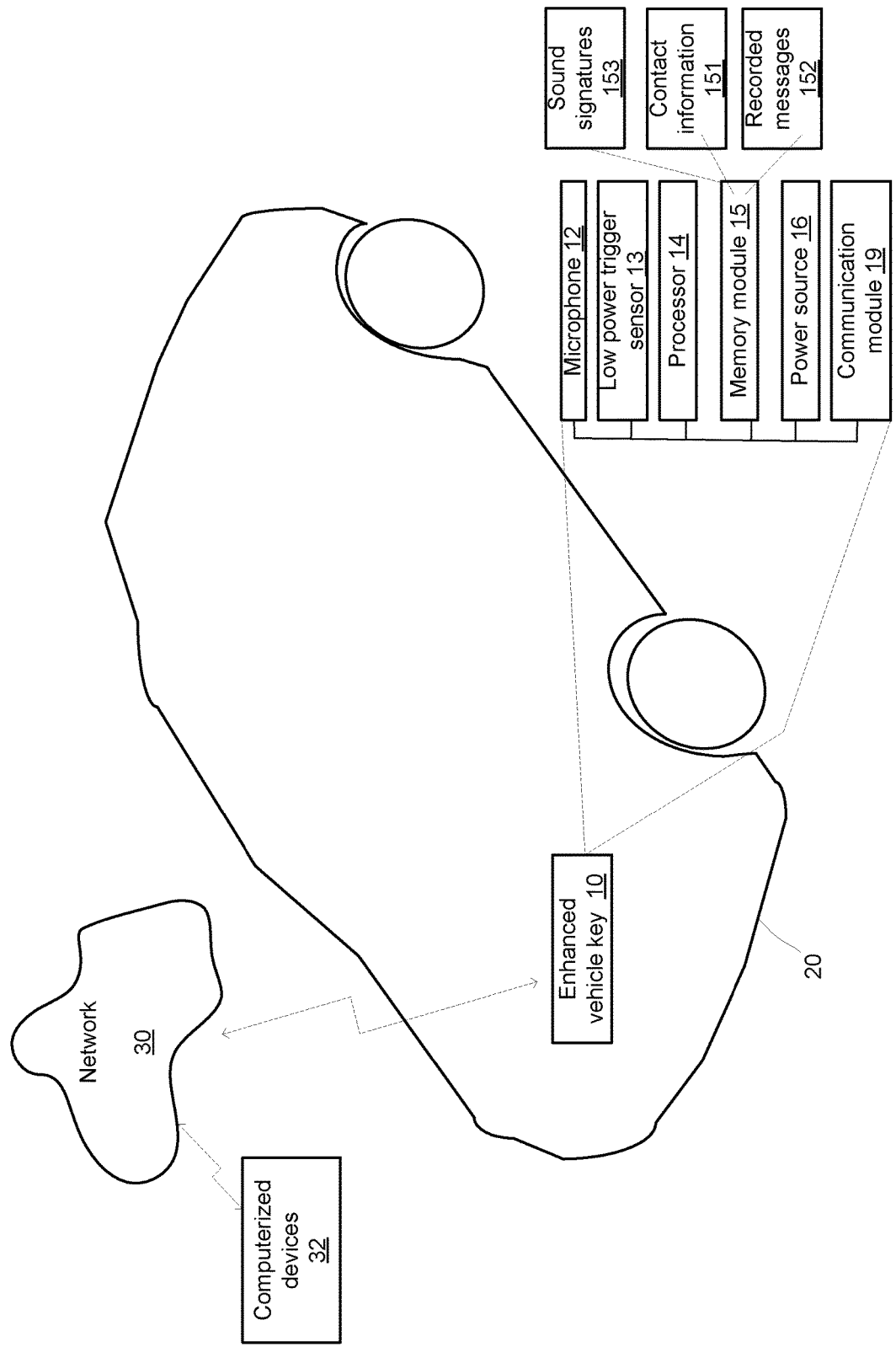
FIG. 1 is an example of a vehicle, and an enhanced vehicle key.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, there will be provides specific examples of embodiments. It will, however, be evident that various modifications and changes may be made therein without departing from the broader spirit and scope of the invention as set forth in the appended claims.

The term "constantly" means uninterrupted and/or at a sampling rate—that may exceed once a second.

There is a provided an enhanced vehicle key and a method for voice triggering using an enhanced vehicle key.

The enhanced vehicle key operates as a vehicle key (mechanical and/or electrical) but also has voice trigger capabilities—and thus is termed an enhanced vehicle key.

The enhanced vehicle key may enable a user to enjoy voice activation while the user is in the vehicle as well when the user is outside the vehicle but it still powered. The enhanced vehicle key may include a rechargeable power supply that can be charged when the enhanced vehicle key is in the car lock. The enhanced vehicle key may operate outside the vehicle while the rechargeable power supply is not empty.

The enhanced vehicle key can used for various purposes, such as:

a. Vehicle finding—the enhanced vehicle key may detect a voice command from a user to locate the vehicle and in response communicate with a vehicle (especially with a vehicle computer—denoted 210 in FIG. 7) and instruct (or request) the vehicle (for example instruct vehicle AV unit 214) to generate any type of indication (audio, visual, and the like) that will indicate the location of the vehicle.

b. Locating the enhanced vehicle key—the enhanced vehicle key may detect a voice command from a user to identify itself and in response may generate any type of indication (audio, visual, and the like) that will indicate the location of the enhanced vehicle key.

c. Sense events that occur in the vicinity of the enhanced vehicle key—such as a presence of a baby in the vehicle, a broken glass, engine activation or deactivation, a crash—and output an alert that may be received by a user that is in the vehicle or by a device (or another user) located outside the vehicle. The alert may be sent to a device (such as a user device, a smartphone) that may sent the report, alert or any other notification to a third party. For example—the alert may be received by the police, by another agency, by a parent (or another related person) of the driver, and the like.

d. Interface with a sensor that may send to the enhanced vehicle key sensed information, and detecting by the enhanced vehicle key the occurrence of an event. For example—the sensor may be activated by the enhanced vehicle key, may be positioned in the vehicle and may sense sound information about events such as a baby crying in the vehicle, crash, tamper attempts, and the like.

The enhanced vehicle key may be always on—in the sense that it may be voice activated at any time—and includes a low power trigger sensor that may be always open. Once the voice trigger is detected the low power trigger sensor may activate other components of the enhanced vehicle key and may communicate with other devices and/or users.

A sound trigger that wakes the low power trigger sensor may be set in advance, learnt during a learning period, change over time, and the like. It may be a whistle, a certain keyword, certain key syllables, and the like.

The sound trigger may be a sound of at least a predefined intensity, a sound of certain frequencies of at least a predefined frequency, and the like.

The enhanced vehicle key may be used for authenticating a user—for example may check that an allowed driver wishes to start the vehicle and may prevent an unauthorized user from starting the vehicle.

The enhanced vehicle key may include a voice recorder (denoted 192 in FIG. 7) for recording voice messages that can be sent (in real time or off-line) to other devices. For example, the enhanced vehicle key may record voice messages while being outside the vehicle, and may send these voice messages (automatically or in response to another voice command) to a multimedia system of the vehicle (or any other communication unit) that in turn may send the voice messages over a social network, or to any other devices.

The enhanced vehicle key may enable registration of a Smartphone with a keyword (when provided with support in the Car infotainment).

The enhanced key may perform always-on voice and audio/podcast listening.

The enhanced vehicle key may be configured (by programming the processor) to pre-process voice algorithms such as acoustic echo canceler, beam forming and noise reduction—in order to enable far-field voice detection and barge-in, far field detection.

The enhanced vehicle key may include a microphone and a speaker that may be connected to a processor such as a SmartVoice System on chip.

The enhanced vehicle key, even when outside the vehicle, may be wirelessly coupled to a communication device (such as a smartphone) that may feed the enhanced vehicle key with voice messages that can be heard by the user.

In addition to one or more microphones, the enhanced vehicle key may (or may not) include additional man machine interfaces such as a speaker and/or one or more light emitters.

Some examples of an enhanced vehicle key 10 are illustrated in FIGS. 1-4.

The enhanced vehicle key may constantly search for a sound trigger.

A sound trigger may be detected by low power trigger sensor 13 that may be "always on" and may be fed by microphone 12.

Once a sound trigger is detected the low power trigger sensor 13 may generate an indication, an alert, or a command that causes other components of the enhanced vehicle key to awake.

As indicated above—the enhanced vehicle key may detect an event, may command other devices (or itself) to perform various operations (such as generating a user perceivable alert, activating or deactivating another device, and the like).

For example—a processor 14 that was in sleep mode may be awakened and may perform the task of searching for a sound of a baby crying. Yet for another example—the processor may be awakened in order to determine a voice command sent by a user after (usually within a limited time frame of few seconds, less than a minute, more than a minute and the like) the voice trigger, and may execute the command or instruct another device to execute the command.

After executing (or participating in the execution of) the voice command—the enhanced vehicle key may return to operate in a low power mode and even may be shut down.

The processor 14 may search for a fit between the sensed sounds and previously stored sound signatures (153) that are indicative of predefined events or predefined voice commands.

The enhanced vehicle key may receive or be trained to identify sound signatures and/or preforming detection and/or classification of acoustic scenes and/or events and/or human emotions/condition.

Sound signatures can be learnt for example, using a supervised learning process. For example—sound signatures of human emotions and/or conditions can be generated, for example, using a supervised learning process that include feeding audio from persons of known emotions/conditions to a neural network. Human emotions/conditions may include emotional situation or physical condition of the key holder or other people, e.g aggression, nervousness, apathy, excited, or drunk, on drugs, etc.

The sound signatures can represent any acoustic scene—for example acoustic scenes that refer to the place or situation in which the key (and its holder) is present, e.g. in the car, parking lot, office, restaurant, or in a meeting, in the rain, watching a movie, etc.

Yet for another example—the acoustic event may refer to almost everything that happens, if it produces some sound, e.g. engine ignition, baby cry, car accident, snoring, police/ambulance/fire fighter vehicle siren, etc.

Additionally or alternatively, the processor 14 may perform any process for detecting an event or a vocal command. The process may be based on a training process. Alternatively—the process may be a training-less process.

The processor 14 may also be configured to generate messages such as recorded massages 152 that may include audio recordings that represent events that are sensed by microphone 12.

Any other message (audio, video, text, audiovisual, and the like) may be generated in addition to or instead the recorded messages.

One or more of the recorded messages 152 may be transmitted using communication module 19.

The one or more recorded messages may be associated with contact information 151 of computerized devices 32 that may be located outside the vehicle. The computerized devices may include communication devices such as mobile phones of a driver of the vehicle and/or mobile phones of other persons—including mobile phones of contact persons of the driver, the police, or other emergency services.

The contact information may include phone numbers, email addresses, social network nicknames or any other information required for delivering the recorded messages to the computerized devices of multiple people.

Communication module 19 may be a short-range communication module, a long-range communication module, a wireless communication module, a cellular communication module, a satellite communication module and the like.

Communication module 19 may communicate with network 30 that may be at least partially located outside the vehicle 20.

The processor and the low-power trigger sensor 13 may be a combination of a Vesper VM1010 wake-on-sound piezoelectric MEMS microphone with a DSP Group DBMD4 ultra-low-power, always-on voice and audio processor.

It should be noted that the enhanced vehicle key may be activated any time, may be activated only when the vehicle is turned off, and the like. The enhanced vehicle key 10 may sense that the vehicle is turned off by communicating with the vehicle computer (denoted 50 in FIG. 4) or by any other manner.

Figure 2:
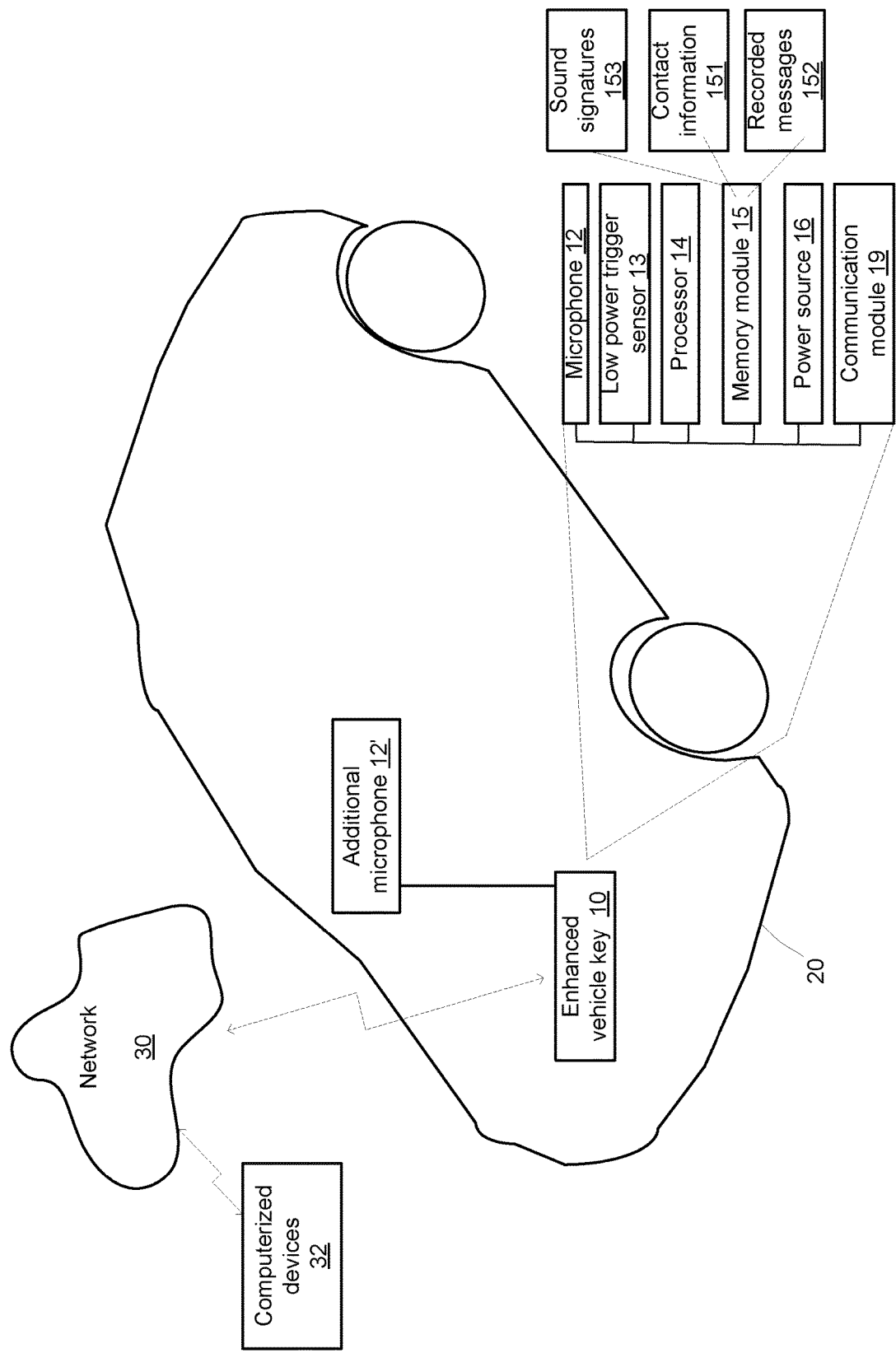
FIG. 2 is an example of a vehicle, and an enhanced vehicle key.
Figure 3:
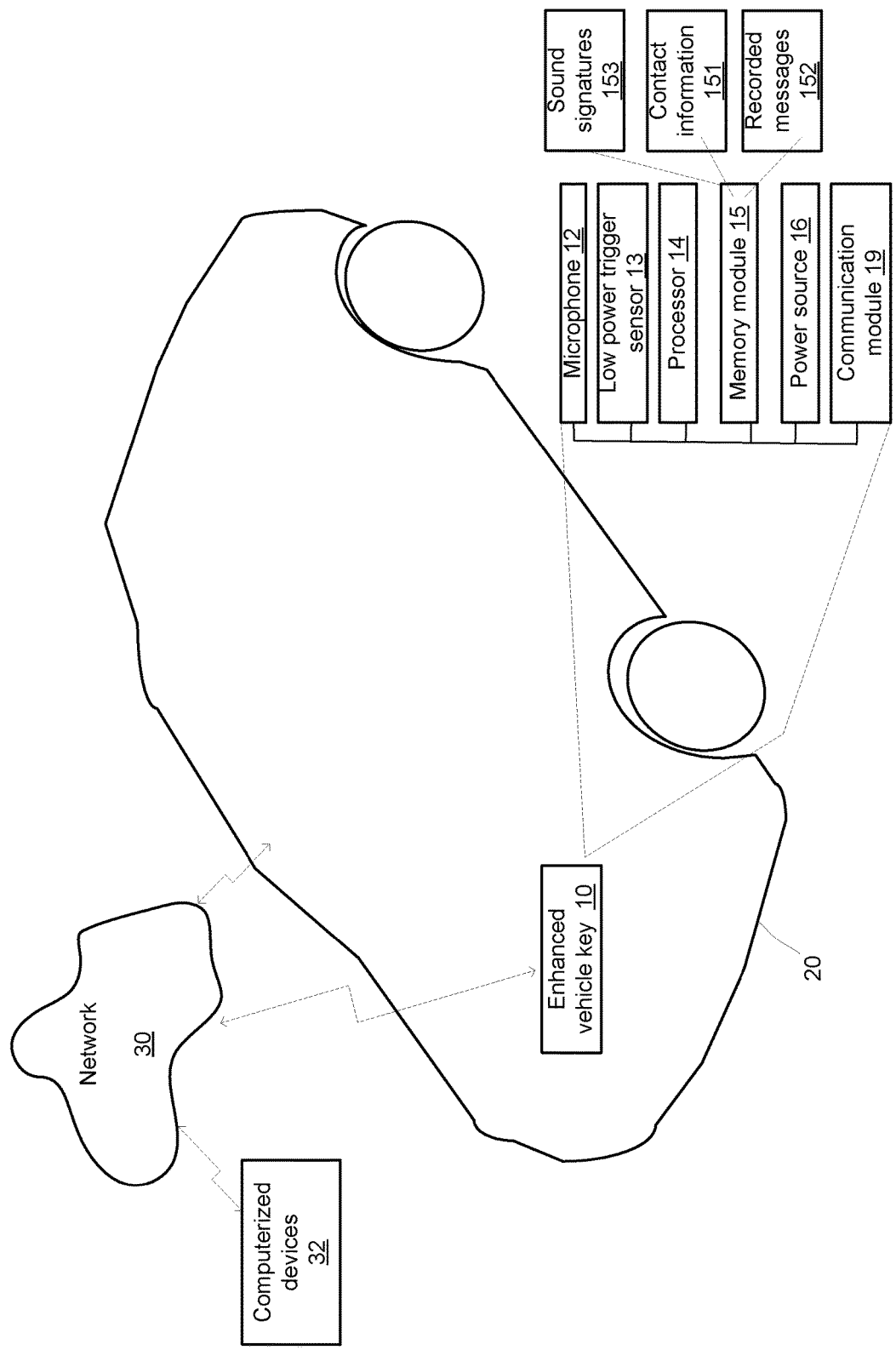
FIG. 3 is an example of a vehicle, and an enhanced vehicle key.
Figure 4:
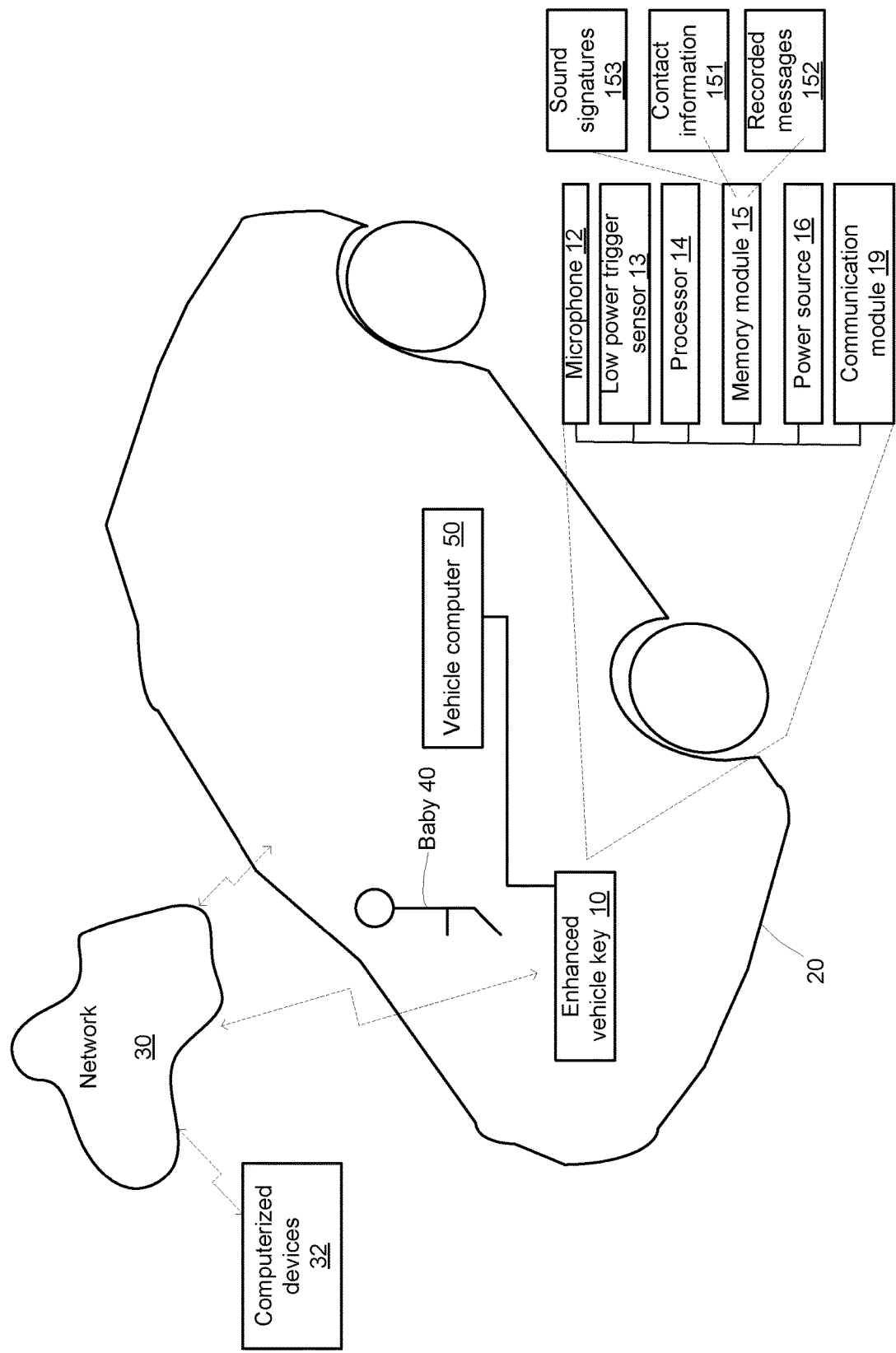
FIG. 4 is an example of a vehicle, and an enhanced vehicle key.

The enhanced vehicle key 10 may include and/or may be fed by multiple sensors-such as additional sensor 12' of FIG. 2.

The enhanced vehicle key 10 and/or any component of the enhanced vehicle key may be located at any location within the vehicle.

Figure 5:
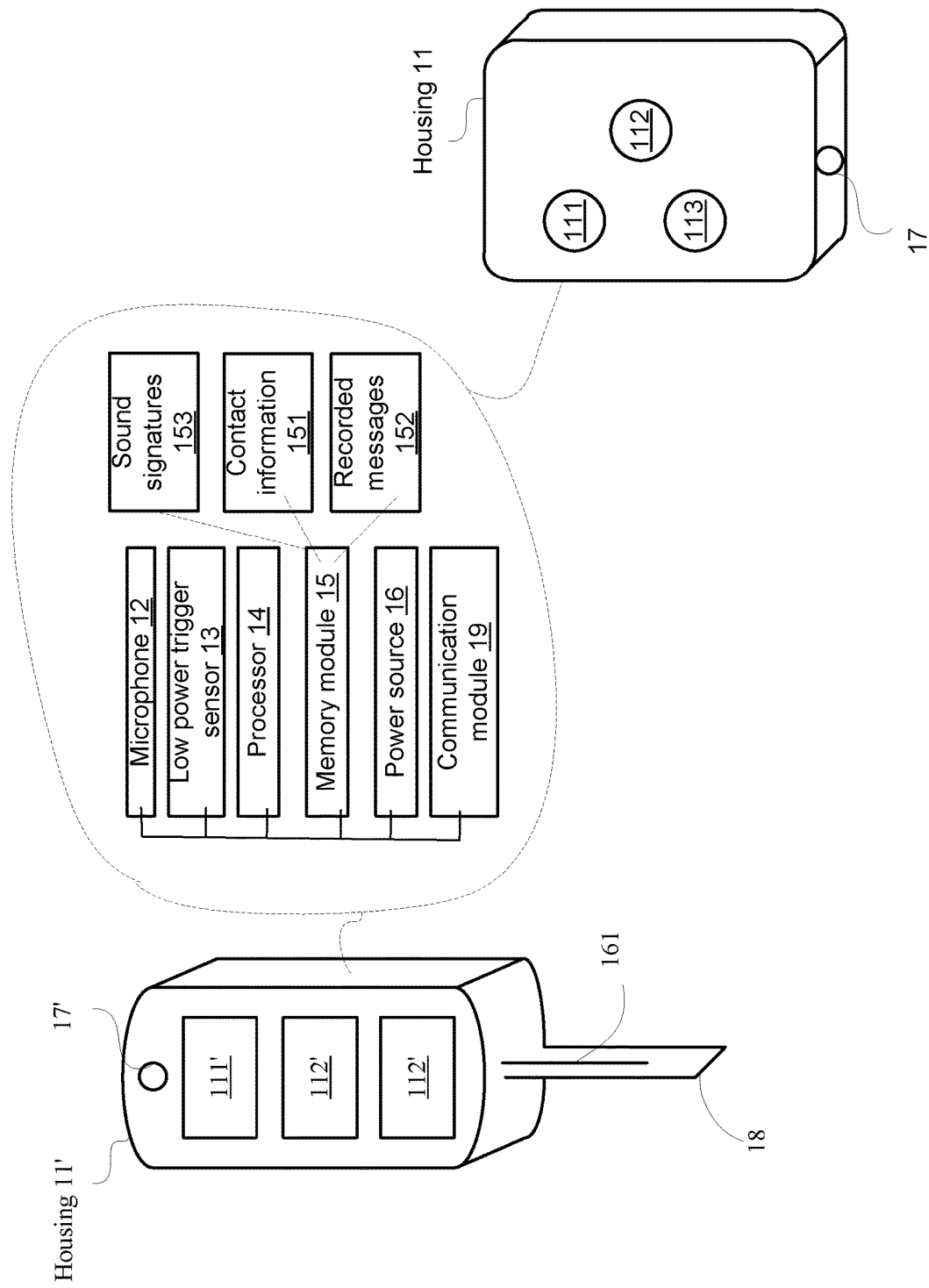
FIG. 5 is an example of an enhanced vehicle key.

FIG. 5 illustrates two examples of housings 11 and 11' of the enhanced vehicle key. The housing may have any shape and/or size and may resemble or may differ from any of the housing used today for vehicle keys. The housing of the enhanced key may be larger than the housing of keys that do not include the extra components required to support the functionalities of the enhanced vehicle key. The enhanced vehicle key may include a blade and may be fixed to the housing or may move in relation to the housing (for example—may flip in and out of the housing).

Housing 11' of FIG. 5 is of a substantially box shape and includes three control buttons 111', 112' and 113'. A blade 18 extends from the housing 11. A conductor 161 may be electrically couple power source 16 to a power supply conductor in the ignition switch of the vehicle. The blade itself may be used to electrically couple the ignition switch to power source 16. Alternatively—the coupling element for providing power to power source 16 can be located outside the blade. Housing 11' may also include an opening or membrane 17 for allowing sound to reach microphone 12 and/or sound to exit the housing.

Housing 11 of FIG. 5 is shaped as a card and includes three control buttons 111, 112 and 113. Housing 11 may also include an opening or membrane 17 for allowing sound to reach microphone 12 and/or sound to exit the housing. Any number of control buttons may be provided.

Figure 6:
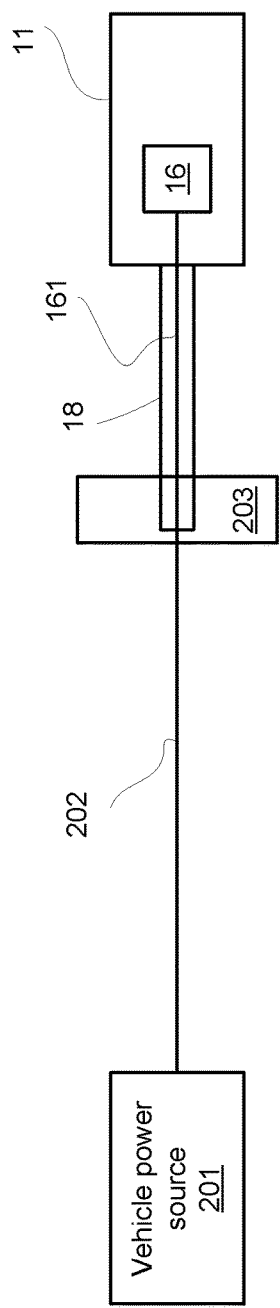
FIG. 6 is an example of a power supply path for charging an enhanced vehicle key.

FIG. 6 illustrates a vehicle power source 201 (any power source located within the vehicle), a conductive path 202 between the vehicle power source 201 and the ignition switch 203, the conductive path 202 is coupled to conductor 161 that is attached to (or integrated in) blade 18, the is electrically coupled to power supply 16 of the enhanced vehicle key (located within housing 11).

Figure 7:
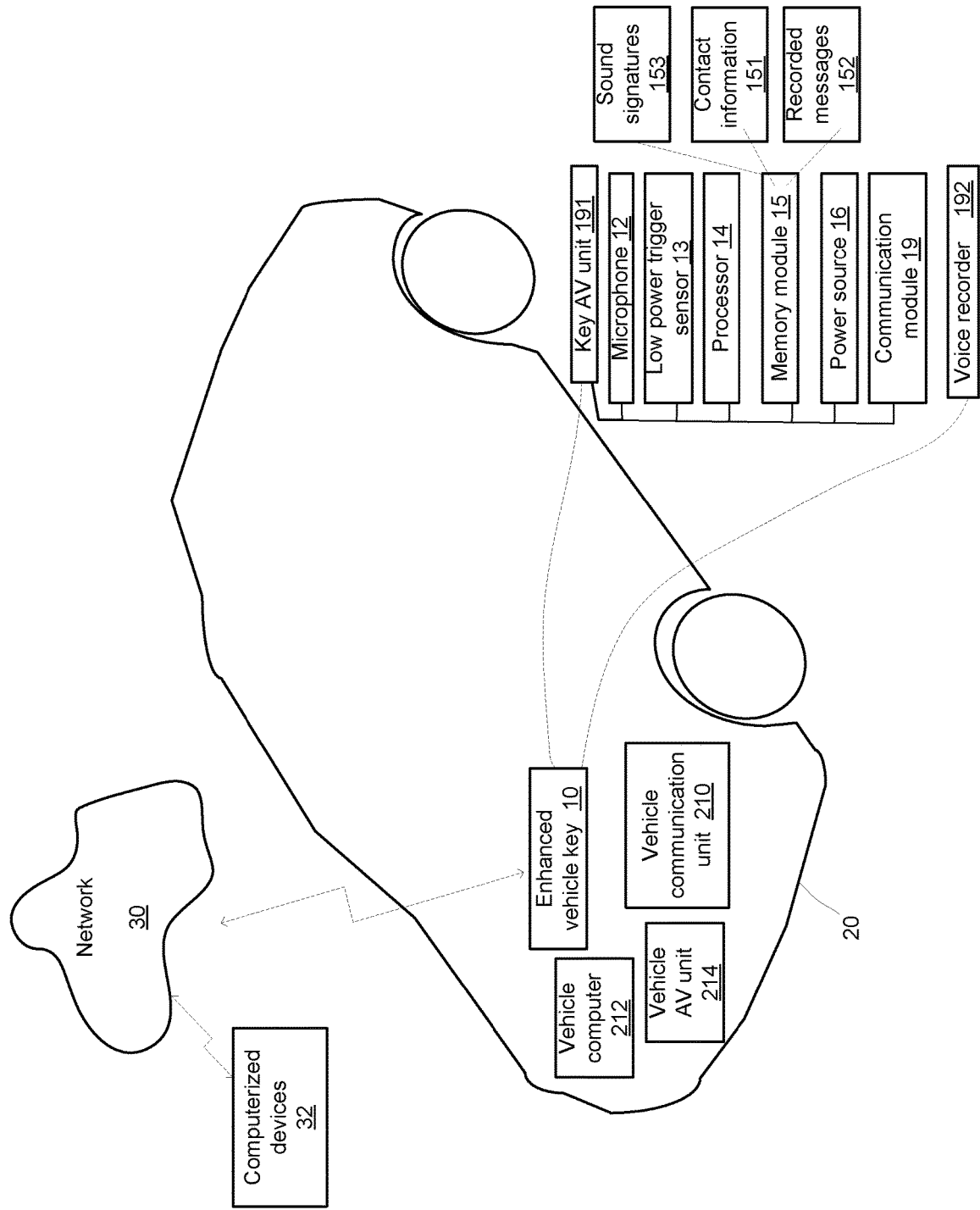
FIG. 7 is an example of a vehicle, and an enhanced vehicle key.

FIG. 7 illustrates enhanced vehicle key that includes microphone 12, low power trigger sensor 13, processor 14, memory module 15, power source 16, communication module 19, voice recorder 192, and key audio-visual (AV) unit 191.

The key AV unit 191 may output visual and/or audio signals—especially AV signals that can be perceived by a human.

The key AV unit 191 may be a part of communication module 19.

The functionality of the voice recorder 192 may be implemented by microphone 12, processor 14 and memory module 15.

The vehicle may include vehicle computer 212, a vehicle audio-visual (AV) unit 214, and vehicle communication unit 210. The vehicle AV unit 214 may output visual and/or audio signals—especially AV signals that can be perceived by a human. The vehicle AV unit 214 may be a part of vehicle communication unit 210.

Figure 8:
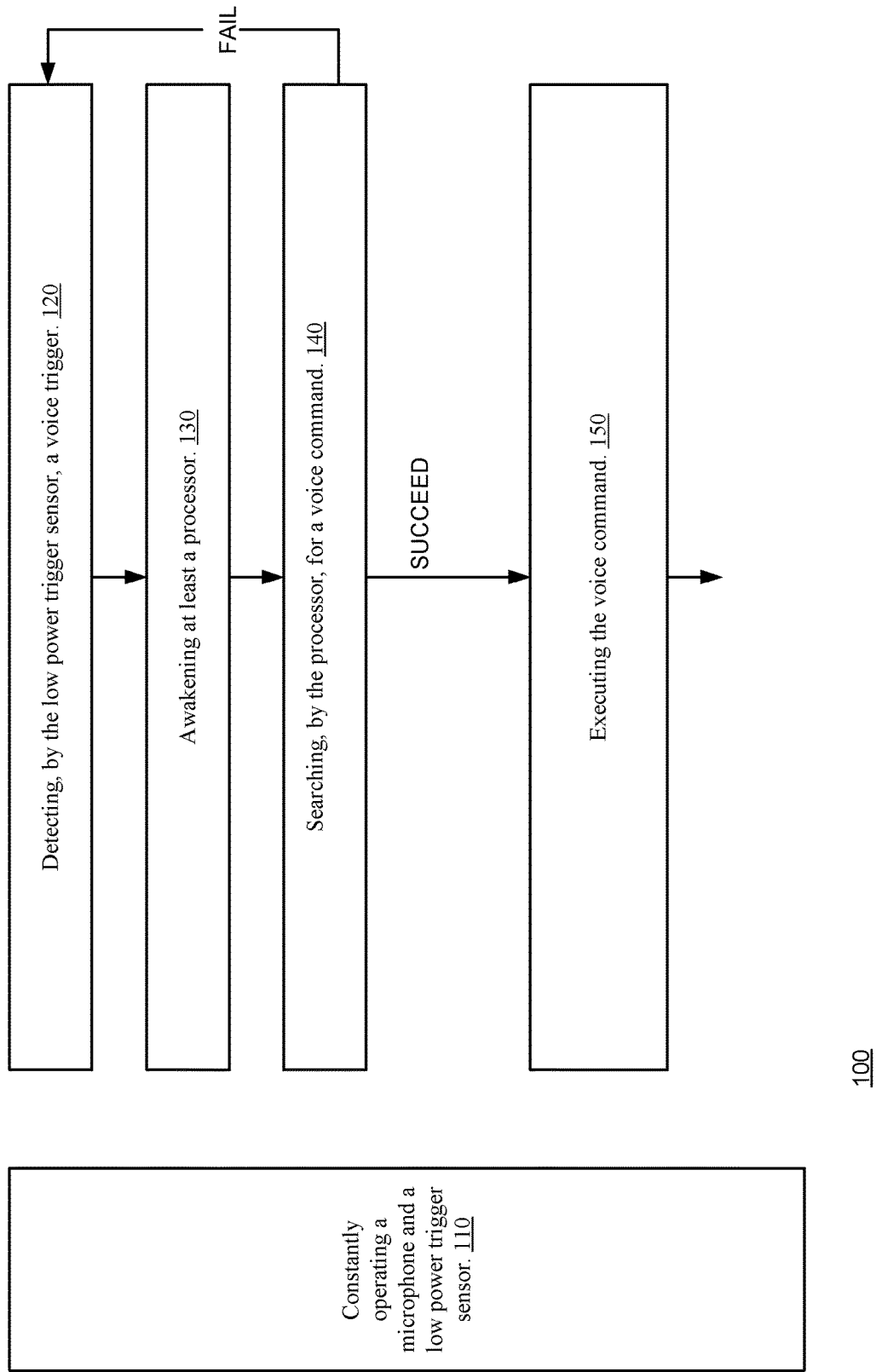
FIG. 8 is an example of a method.

FIG. 8 illustrates an example of a method 100.

Method 100 may start by step 110 of constantly operating a microphone and a low power trigger sensor.

In parallel to step 110, method 100 may include a sequence of steps.

The sequence starts by step 120 of detecting, by the low power trigger sensor, a voice trigger.

Step 120 may be followed by step 130 of awakening at least a processor.

Step 130 may be followed by step 140 of searching, by the processor, for a voice command.

If the search failed then step 140 is followed by step 110.

If the search succeeded step 140 is followed by step 150 of executing the voice command.

Figure 9:
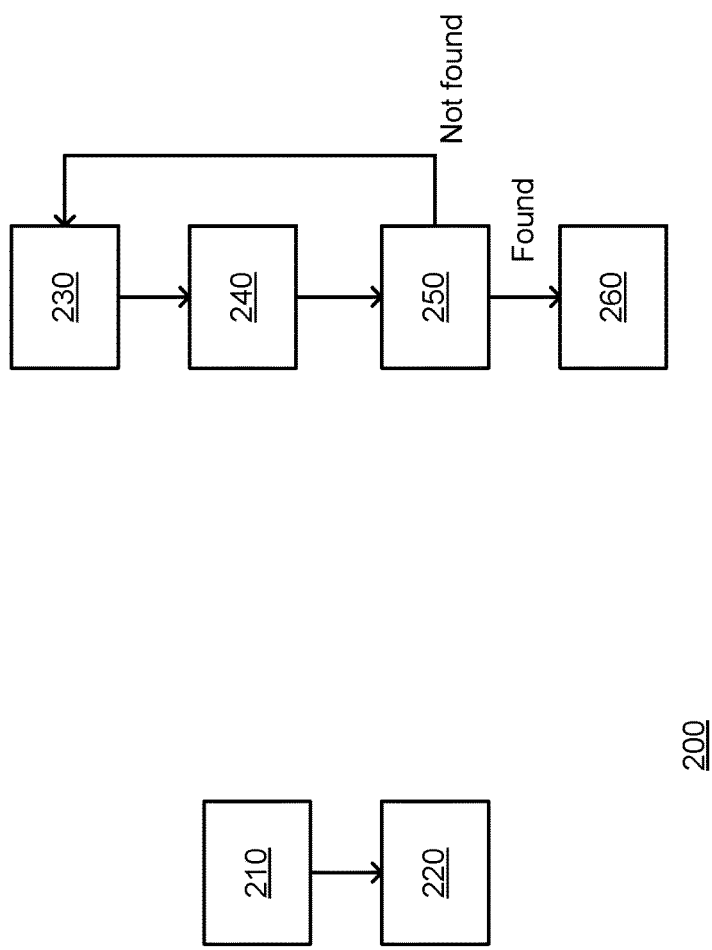
FIG. 9 is an example of a method.

FIG. 9 illustrates method 200.

There may be provided a method for voice activation.

Method 200 may include steps 210, 220, 230 and 240.

Step 210 may include powering the enhanced vehicle key while a part of the enhanced vehicle key is positioned within an ignition switch of a vehicle. This allows the enhanced vehicle key to use a compact power supply unit and can be charged slowly (using smaller capacitors), and simpler circuits.

Step 220 may include supplying power to a low power trigger sensor of an enhanced vehicle key, by a power source of the enhanced vehicle key. Step 210 may precede step 220 or may be executed during step 210 or before step 210.

Method 200 may include step 230 of waiting to detect a voice trigger, by the low power trigger sensor. When detecting then jumping to step 240.

Step 230 may be followed by step 240 of awakening, following the detection, a processor of the enhanced vehicle key. Once awakened the processor may receive power from the power source. Power may also provided to other components of the enhanced vehicle key.

Step 240 may be followed by step 250 of searching, by the processor, for a voice command.

If finding the command then going to step 260 of executing the voice command. Else—shutting down the processor and jumping back to step 230.

Step 260 may also be followed by shutting down the processor and jumping back to step 230.

Step 260 may be executed by the processor, by any part of the enhanced vehicle key, may be executed by the enhanced vehicle key in corporation of another device or unit, and the like.

Steps 230, 240, 250 and 260 may be executed when the enhanced vehicle key is within the vehicle, outside the vehicle, within the ignition switch or outside the ignition switch.

Step 260 may include at least one out of:

a. Requesting, by the enhanced vehicle key, the vehicle to generate a vehicle location indication that is indicative of a location of the vehicle.

b. Generating, by the enhanced vehicle key, a key location indication that is indicative of a location of the enhanced vehicle key.

c. Determining, by the enhanced vehicle key, whether a baby is present in the vehicle.

d. Determining, by the enhanced vehicle key, an occurrence of an accident.

e. Reporting by the enhanced vehicle key (to a user, to the vehicle, to an entity outside the vehicle) about an occurrence of an detected event and/or situation, and reporting the occurrence of the accident.

f. Determining, by the enhanced vehicle key, an occurrence of an event. The event may be at least one out of a broken glass, a vehicle engine activation, a vehicle engine deactivation.

g. Receiving sensed information from a sensor located outside the enhanced vehicle key, and determining an occurrence of an event based on the sensed information.

h. Receiving a message, recording the message, and playing the recorded message (for example automatically and/or in response to another voice command).

The method may include applying, by the processor, one or more pre-processing voice algorithms, on audio signals detected by a microphone of the enhanced vehicle key.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

We claim:

1. A method for voice activation, the method comprises: supplying power to a low power trigger sensor of an enhanced vehicle key, by a power source of the enhanced vehicle key; wherein the supplying of power is preceded by powering the enhanced vehicle key while a part of the enhanced vehicle key is positioned within an ignition switch of a vehicle; detecting, by the low power trigger sensor, a voice trigger; awakening, following the detection, a processor of the enhanced vehicle key; searching, by the processor, for a voice command; and when finding the voice command then executing the voice command.

2. The method according to claim 1 wherein the executing of the voice command comprises requesting, by the enhanced vehicle key, the vehicle to generate a vehicle location indication that is indicative of a location of the vehicle.

3. The method according to claim 1 wherein the executing of the voice command comprises generating, by the enhanced vehicle key, a key location indication that is indicative of a location of the enhanced vehicle key.

4. The method according to claim 1 wherein the executing of the voice command comprises determining, by the enhanced vehicle key, whether a baby is present in the vehicle.

5. The method according to claim 1 wherein the executing of the voice command comprises determining, by the enhanced vehicle key, an occurrence of an accident and reporting the occurrence of the accident.

6. The method according to claim 1 wherein the executing of the voice command comprises determining, by the enhanced vehicle key, an occurrence of an event.

7. The method according to claim 6 wherein the event is selected out of a broken glass, a vehicle engine activation, a vehicle engine deactivation.

8. The method according to claim 6 wherein the determining is preceded by receiving sensed information from a sensor located outside the enhanced vehicle key, wherein the determining is based on the sensed information.

9. The method according to claim 6 comprising reporting the occurrence of the event.

10. The method according to claim 1 wherein the execution of the voice command comprises receiving a message and recording the message;
detecting, by the low power trigger sensor, another voice trigger;
awakening, following the detection of the other voice trigger, the processor;
searching, by the processor, for another voice command; and
when finding the other voice command then executing the other voice command; wherein the other voice command is for playing the recorded message; and wherein the executing comprises playing the recorded message.

11. The method according to claim 1 comprising applying, by the processor, one or more pre-processing voice algorithms, on audio signals detected by a microphone of the enhanced vehicle key.

12. An enhanced vehicle key, comprising:
a housing;
a power source;
a processor;
a low power trigger sensor that is configured to detect a voice trigger and to participate in an awakening, following the detection, the processor;
wherein the processor is configured to search for a voice command and to participate in an execution of a voice command when finding the voice command.

13. The enhanced vehicle key according to claim 12 that is configured to execute the voice command by requesting, by the enhanced vehicle key, the vehicle to generate a vehicle location indication that is indicative of a location of the vehicle.

14. The enhanced vehicle key according to claim 12 that is configured to execute the voice command by generating a key location indication that is indicative of a location of the enhanced vehicle key.

15. The enhanced vehicle key according to claim 12 that is configured to execute the voice command by determining whether a baby is present in the vehicle.

16. The enhanced vehicle key according to claim 12 that is configured to execute the voice command by determining an occurrence of an accident and reporting the occurrence of the accident.

17. The enhanced vehicle key according to claim 12 that is configured to execute the voice command by determining an occurrence of an event.

18. The enhanced vehicle key according to claim 17 wherein the event is selected out of a broken glass, a vehicle engine activation, a vehicle engine deactivation.

19. The enhanced vehicle key according to claim 17 that is configured to receive sensed information from a sensor located outside the enhanced vehicle key, wherein the determining is based on the sensed information.

20. The enhanced vehicle key according to claim 17 that is configured to report the occurrence of the event.

21. The enhanced vehicle key according to claim 12 that is configured to:
receive a message and recording the message;
detect, by the low power trigger sensor, another voice trigger;
awaken, following the detection of the other voice trigger, the processor;
search, by the processor, for another voice command; and
when finding the other voice command then execute the other voice command; wherein when the other voice command is for playing the recorded message then playing the recorded message.

22. The enhanced vehicle key according to claim 12 wherein the processor is configured to apply one or more pre-processing voice algorithms, on audio signals detected by a microphone of the enhanced vehicle key.

* * * * *